US 11,867,611 B2

(12) United States Patent
Vikhagen

(10) Patent No.: US 11,867,611 B2
(45) Date of Patent: Jan. 9, 2024

(54) OPTICAL-INTERFERENCE ANALYSIS

(71) Applicant: OPTONOR AS, Trondheim (NO)

(72) Inventor: Eiolf Vikhagen, Trondheim (NO)

(73) Assignee: OPTONOR AS, Trondheim (NO)

( * ) Notice: Subject to any disclaimer, the term of this patent is extended or adjusted under 35 U.S.C. 154(b) by 615 days.

(21) Appl. No.: 17/059,862

(22) PCT Filed: May 31, 2019

(86) PCT No.: PCT/GB2019/051514
§ 371 (c)(1),
(2) Date: Nov. 30, 2020

(87) PCT Pub. No.: WO2019/229473
PCT Pub. Date: Dec. 5, 2019

(65) Prior Publication Data
US 2021/0255093 A1 Aug. 19, 2021

(30) Foreign Application Priority Data
Jun. 1, 2018 (GB) .................................. 1809011

(51) Int. Cl.
*G01N 21/17* (2006.01)
*G01N 21/45* (2006.01)
*G01N 21/88* (2006.01)

(52) U.S. Cl.
CPC ......... *G01N 21/1702* (2013.01); *G01N 21/45* (2013.01); *G01N 21/8851* (2013.01);
(Continued)

(58) Field of Classification Search
CPC ............. G01N 21/2702; G01N 21/45; G01N 21/8851; G01N 2021/1708; G01N 2021/8887
See application file for complete search history.

(56) References Cited

U.S. PATENT DOCUMENTS

2014/0085449 A1* 3/2014 Mandelis ............... G01N 21/71
348/77
2017/0350690 A1* 12/2017 Hatahori ............ G01B 9/02096

FOREIGN PATENT DOCUMENTS

WO 0003197 A1 1/2000
WO 03067246 A2 8/2003
(Continued)

OTHER PUBLICATIONS

Notification of Transmittal of the International Search Report and the Written Opinion (Form PCT/ISA/220), International Search Report (Form PCT/ISA/210), and Written Opinion (Form PCT/ISA/237) for International Patent Application No. PCT/GB2019/051514, dated Aug. 19, 2019, 26 pages, 17 pages.
(Continued)

*Primary Examiner* — Kevin Quarterman
*Assistant Examiner* — Jarreas Underwood
(74) *Attorney, Agent, or Firm* — Withrow & Terranova, P.L.L.C; Vincent K. Gustafson

(57) ABSTRACT

A system is used to excite an object at a vibration frequency, in order to induce stationary or travelling waves having the vibration frequency on the surface of the object. An optical interferometer is configured to use optical interference to determine vibration amplitude and phase data of the stationary or travelling wave at each of a plurality of points on the surface, relative to a reference phase. A processing system is used to apply a spatial derivative filter to the vibration phase data, and the resulting spatial-derivative-of-phase data is processed to determine a property of the object, and is further processed to generate graphical-representation data for outputting on a display device.

22 Claims, 4 Drawing Sheets

(52) U.S. Cl.
CPC ............ *G01N 2021/1708* (2013.01); *G01N 2021/8887* (2013.01)

(56) References Cited

FOREIGN PATENT DOCUMENTS

| WO | 2006001712 A2 | 1/2006 |
| WO | 2014088424 A1 | 6/2014 |
| WO | 2017085457 A1 | 5/2017 |

OTHER PUBLICATIONS

Nelvik, Kristian, "SNT 410", Oct. 30, 2017, Retrieved from the Internet: <URL:https://optonor.com/Userfiles/Upload/files/4-PAGER_SNT410.PDF> [retrieved on Aug. 5, 2019].

Nelvik, Kristian, "Composite Wrap Repairs", Oct. 30, 2017, Retrieved from the Internet: <URL:https://optonor.com/Userfiles/Upload/files/APPLICATION%20NOTE_17-001.pdf> [retrieved on Aug. 6, 2019].

Nelvik, Kristian, "Composite Wrap Repairs", Application Note 17-001, Retrieved from the Internet: <URL:https://optonor.com/Userfiles/Upload/files/APPLICATION%20NOTE_17-001.pdf> [retrieved on Nov. 29, 2020].

Nelvik, Kristian, "NDT—Composite Vessels", Application Note 17-002, Retrieved from the Internet: <URL:https://optonor.com/Userfiles/Upload/files/APPLICATION%20NOTE_17-002(3).pdf> [retrieved on Nov. 29, 2020].

Giurgiutiu, Victor et al., "Embedded Non-destructive Evaluation for Structural Health Monitoring, Damage Detection, and Failure Prevention", The Shock and Vibration Digest, vol. 37, No. 2, Mar. 2005, pp. 83-105.

Vikhagen, Eiolf, "Nondescructive testing by use of TV holography and deformation phase gradient calculation," Applied Optics, vol. 29(1), Jan. 1, 1990, pp. 137-144.

Lopes, H. et al., "Localization of damage with speckle shearography and higher order spatial derivatives," Mechanical Systems and Signal Processing, Jan. 2014, Elsevier Ltd., 15 pages.

Examination Report for European Patent Application No. 19730473.6, dated May 25, 2023, 7 pages.

* cited by examiner

OPTICAL-INTERFERENCE ANALYSIS

This application is a 35 U.S.C. § 371 national phase filing of International Application No. PCT/GB2019/051514 filed on May 31, 2019, and claims the benefit of United Kingdom Patent Application No. 1809011.8 filed on Jun. 1, 2018, wherein the disclosures of the foregoing applications are hereby incorporated by reference herein in their respective entireties.

This invention relates to methods and system for analysing an object using optical interference.

It is known to use laser light to analyse objects, such as for the non-destructive testing of machine parts—for example, ESPI, electronic shearography, and laser Doppler vibrometry (LDV).

Electronic speckle pattern interferometry (ESPI)—also known as Television (TV) holography or digital speckle pattern interferometry (DSPI)—uses an electronic image sensor (e.g., a CMOS array) to record successive frames of an interference pattern created by interference between i) a reference laser beam and ii) light from the same expanded laser beam that has been directed onto a surface of an object, and scattered by the surface. The surface may be vibrating or otherwise changing shape.

The image frames can then be processed, individually or in combination, to determine information about how the surface is vibrating. The object may be being excited by some external means—e.g. by being struck, or by being connected to a vibration-generating unit.

Electronic shearography—also known as electronic speckle shear interferometry—is a related technique. However, instead of using a reference beam, in shearography an interference pattern is generated between i) coherent light scattered by a surface of the object and ii) a copy of this scattered light which has been shifted laterally in a shearing direction. The optical set-up may be similar to that of a Michelson interferometer. Each pixel of the imaging sensor receives light from two spatially-separated points on the surface, and the interference of the light from these two points means that the pixel intensity contains information about one how one point moves relative to the other point. Because shearography measure relative displacements over the surface, rather than absolute displacements, it may be more robust to external vibrations than ESPI. Shearography yields spatial gradient information across the surface of the object, rather than the displacement (i.e. depth) information obtained using ESPI.

Both techniques allow a full-field area of the object under investigation to be imaged in a single frame. This allows a full-frame static image, or an animated sequence of images, or processed image data sets, to be presented to a human operator, on an electronic display, so that the behaviour of the object when it is deflected or vibrated can be seen by the operator. This can enable an operator to understand the object's vibrational behaviour better, or to identify possible defects within the object. Data may be displayed in real-time (i.e. while the object is vibrating) or at a later point in time (e.g., after post-processing of a collected data set).

The applicant's earlier patent applications WO 2006/001712 and WO 2014/088424 describe various techniques for using optical interferometry to analyse objects that are subjected to a static deflection or that are caused to vibrate.

A related technique to shearography is in-plane shearography (sometimes called in-plane ESPI) which is sensitive to vibrations or static deflections in a different direction compared to a normal ESPI or shearography system. An in-plane system can be configured to measure in-plane movements of the object under investigation.

A different technique, which also relies on optical interference of a laser beam, is Laser Doppler Vibrometer (LDV). A laser beam is split into a reference beam and a measurement beam. The measurement beam is reflected off a vibrating object, at a point on the object. The motion of the object induces a Doppler frequency shift in the measurement beam, proportional to the velocity of the object at the measurement point. A photodiode receives a superposition of the reference beam and the frequency-shifted measurement beam. Constructive and destructive interference between the two beams at the photodiode results in an amplitude-modulated "beat" signal, whose intensity encodes the component of object velocity in the direction of the measurement beam. The vibration amplitude and phase at the measurement point can be calculated from the photodiode output. By raster-scanning the measurement beam over the object surface, full-field data of the surface vibration can be acquired over a region of the object.

The present inventor has realised, however, that it possible to enhance the usefulness of known optical-interference-based analysis techniques, such as these, by performing certain additional steps.

Thus, from a first aspect, the invention provides a method of analysing an object, comprising:

exciting the object at a vibration frequency so as to induce a stationary or travelling wave, having the vibration frequency, on a surface of the object;

using optical interference to determine vibration phase data for each of a plurality of points on the surface, the vibration phase data representing, for each point, a respective phase, relative to a common reference phase, of the stationary or travelling wave;

applying a digital spatial-derivative filter to the vibration phase data to generate spatial-derivative-of-phase data representative of spatial changes in vibration phase across the surface; and processing the spatial-derivative-of-phase data to determine a property of the object, or outputting a graphical representation of the spatial-derivative-of-phase data on a display device.

From a further aspect, the invention provides a system for analysing an object, comprising:

an optical-interference-based measurement apparatus configured to use optical interference to determine vibration phase data for each of a plurality of points on a surface of an object that is vibrating at a vibration frequency such that a stationary or travelling wave, having the vibration frequency, is present on the surface of the object, the vibration phase data representing, for each point, a respective phase, relative to a common reference phase, of the stationary or travelling wave; and a processing system configured to:

apply a digital spatial-derivative filter to the vibration phase data to generate spatial-derivative-of-phase data representative of spatial changes in vibration phase across the surface; and process the spatial-derivative-of-phase data to determine a property of the object, or generate graphical-representation data from the spatial-derivative-of-phase data for outputting on a display device.

It will be seen that, in accordance with these aspects of the invention, differences in the phase of the surface vibration over the surface are used to analyse the object. The inventor has found that non-uniform changes in the vibration phase, over the surface, can reveal useful information about the composition of the object under the surface. Such differences may be identified by a human or a computer when analysing an image that shows a spatial gradient of phase (e.g., a first spatial derivative of phase or a second spatial derivative of phase, in one or more directions) over the surface to identify where there are significant or abrupt changes in phase on the surface.

Note that vibration phase can be constant at a particular point, or it may change over time. Here, however, the methods are directed primarily at differences in phase with distance, rather than over time (although this does not exclude the possibility of the vibration phase data additionally including some information about temporal changes, in some embodiments). Thus, the vibration phase data may represent the respective phases, at the plurality of points, at one or more common moments in time.

This approach has been found to be particularly useful when the wave is a travelling wave. However, it may still reveal useful information when at least some of the surface is covered by one or more stationary (standing) waves.

The object may be any single or compound object, such as a composite panel or polymer gas bottle, vehicle body panel, an aircraft structure, a turbine blade, an oil pipeline, a bolt, a musical instrument, etc. The method may be used to identify faults or imperfections in the object. The object may be a composite structure, such as a polymer and/or metal composite structure. The object may be a metallic structure, whose thickness may vary due to corrosion. The analysis may be used to identify corrosion, de-laminations, de-bonds, impact damage, material cracks, flaws or other weaknesses, or to detect loose components e.g. in bolted or riveted structures. However, this is not essential, and methods disclosed herein could, for example, be used for scientific enquiry in order to gain a better understanding of the composition or behaviour of an object.

The method may be a method of non-destructive testing of the object, or of vibration analysis. The system may be a non-destructive testing system or a vibration analysis system.

The object may be excited in any appropriate way. The system may comprise means (e.g., an exciter) for exciting the object, preferably at the vibration frequency, so as to induce the stationary or travelling wave on the surface of the object—e.g., by an acoustic signal or by direct mechanical excitation. The excitation may create a plurality of travelling or standing waves on the surface of the object, which may have a common wavelength or different wavelengths. The object may be excited by an exciter, such as an electro-mechanical actuator—e.g., a piezoelectric transducer. The exciter may be in contact with the object, or may be coupled to the object through a fluid medium such as air. For a substantially planar object, the object may be excited in an in-plane direction or in an out-of-plane direction. The vibration frequency may be an audible frequency, an infrasonic frequency, or an ultrasonic frequency. The exciter could vibrate the surface at a plurality of frequencies, e.g., using white noise; however, single-frequency excitation at the vibration frequency may be preferred at least in some embodiments. The exciter may be external to the object, or it may be part of the object—e.g., being embedded in the object. The may be a plurality of excitation sources, e.g., at different locations on or adjacent the object. The vibration frequency preferably induces a harmonic vibration.

The common reference phase may be defined by a motion of the exciter, or it may be the phase of a reference point on the surface (which could be a particular point, or a notional point that is not specifically identified by the system), or it may be the phase of a reference signal, such as a temporal reference signal received or generated by the system.

The surface of the object may be continuous or discontinuous. It may be planar, curved, bent or shaped in any way. The wave, or a plurality of waves, may be induced on part or all of the surface. It will be appreciated that, while the vibration at the surface of the object is used for measurement purposes, in practice it is not just the surface that moves—the object beneath the surface will also be involved in the vibration. In some cases the entire object may vibrate.

The optical-interference-based measurement apparatus may comprise an optical interferometer. It may be any apparatus that can acquire vibrational phase data over a surface. It may be an ESPI apparatus, or an electronic shearography apparatus. It may comprise a scanning laser Doppler vibrometer (LDV). It may comprise a measurement system based on digital image correlation, which may use any type of full field measurement of amplitude and phase; such a measurement system may support the direction of the vibration movements being in any direction, including in-plane, out-of-plane, or a combination of in-plane and out-of-plane. For example, the optical-interference-based measurement apparatus may comprise an illumination apparatus for generating two expanded illumination beams, which may illuminate the object surface from different directions, where one of the beams works as a reference for the other; it may comprise a camera for viewing the surface, without a separate reference beam. Each point on the surface and each point on the camera array may thus receive light from two coherent beams, with the interference being such that the system can measure transverse displacements (vibrations) of the object. Such an approach may be used to detect up in-plane vibration movements in the object instead of, or in addition to, out-of-plane vibrations.

The optical-interference-based measurement apparatus may comprise any one or more of: coherent light sources such as a laser, beam-splitters, filters, lenses, detectors, cameras, control logic, etc. It may determine vibration phase data, $\beta(x, y)$, for the plurality of points on the surface simultaneously (e.g., simultaneous full-field imaging) or sequentially (e.g., raster scanning). It may comprise a two-dimensional image sensor, e.g., for full-field imaging. It may be configured to direct coherent light at a point or a region of the surface of the object.

The vibration phase data may represent the phase of the vibration at each point in any appropriate way. It may represent the absolute displacement of the surface (e.g., when using ESPI), or the phase of the velocity (i.e., time derivative of displacement) of the surface along an observation axis (e.g., when using LDV), or any other information from which vibration amplitude and/or phase can be derived. In some embodiments, the vibration phase data may represent the phase of a relative displacement of the surface, such as a spatial displacement derivative in a particular direction; this could be in a shearing direction, when using shearography, or in a different direction—i.e., $\partial \vec{d}/\partial \vec{s}$, where d is displacement in a given direction, and s is a shearing direction.

The vibration phase data may be acquired for any number of points over the surface—e.g., tens, hundreds, thousands or millions of points. The points may be uniformly spaced, in one or two dimensions, over the surface of the object, or over an image plane of the optical-interference-based measurement apparatus. For example, the points may correspond to pixels in an imaging sensor. The vibration phase data may be stored in a digital memory of the processing system.

The processing system may take any suitable form. It may comprise one or more processors, FPGAs, ASICs, DSPs, discrete electronic components, etc. It may comprise volatile and/or non-volatile memory. The processing steps disclosed herein may be implemented entirely in hardware (e.g., using physical logic gates), or entirely in software, or a combination of the two. The processing system may be in one unit or it may be distributed—e.g., over a network. It may comprise hardware and/or software.

The digital spatial-derivative filter may be implemented by a software algorithm. It may calculate a spatial gradient value for some or all of the plurality of points on the surface. The vibration phase data may be phase-unwrapped before the digital spatial-derivative filter is applied to the data. The filter may be configured to output a spatial first derivative of the vibration phase. However, in other embodiments it may output other spatial-derivative-of-phase data that is related to, or derived from, a spatial derivative of phase; for example, in some embodiments, the spatial-derivative-of-phase data may represent a second derivative of the phase. The second derivative can help to highlight the boundaries of a defect region, which may be useful in some situations. The filter may calculate a respective spatial gradient of the vibration phase data in one or more directions—e.g., in two orthogonal directions. It may combine spatial gradient information from two or more directions so as to determine a respective maximum value, over all directions, of the spatial gradient of the vibration phase, for each of a plurality of points on the surface. In some embodiments, the spatial-derivative filter may be applied to the vibration phase data using a convolution filter. The spatial-derivative filter may comprise an edge-detection filter, a Sobel derivative filter, a Prewitt derivative filter, a Gaussian derivative filter, Laplacian filter, or any other appropriate linear or non-linear filter.

The resulting spatial-derivative-of-phase data may be stored in an electronic memory. In some embodiments, the object may be excited at a plurality of different vibration frequencies. The object may be excited a multiple frequencies simultaneously, but in a preferred set of embodiments the object is excited at different frequencies in sequence—i.e., being excited only at the (first) vibration frequency at a first time; it may be excited at a different, second vibration frequency only at a second time, different from the first time. Respective vibration phase data may be obtained for each vibration frequency. The digital spatial-derivative filter may be applied to each set of vibration phase data to generate respective spatial-derivative-of-phase data for each vibration frequency. The spatial-derivative-of-phase data from a plurality of vibration frequencies may be combined to generate combined spatial-derivative-of-phase data in any appropriate way—for example, a point-wise averaging (e.g., mean) of a plurality of spatial-derivative-of-phase data sets may be performed. Such spatial-derivative-of-phase data relating to a plurality of vibration frequencies can provide a better analysis of the object, since some properties of the object (e.g., defects) may affect the phase of surface waves only at certain vibration frequencies.

When shearography is used to determine the vibration phase data, respective vibration phase data may be obtained for each of a plurality of shear angles or shear levels. Respective spatial-derivative-of-phase data may be determined for each shear angle or shear level, and the spatial-derivative-of-phase data may be combined (e.g., by taking a point-wise mean) to obtain shear-averaged spatial-derivative-of-phase data. Some embodiments may apply speckle averaging to obtain speckle-averaged spatial-derivative-of-phase data.

References to spatial-derivative-of-phase data herein should be understood as encompassing spatial-derivative-of-phase data after any such frequency combining and/or shear-averaging and/or speckle-averaging has been applied.

The spatial-derivative-of-phase data may be processed in any appropriate way to determine a property of the object. An image-processing technique such as an edge-detection filter may be applied to the data. A computer-vision, machine-learning, artificial-intelligence or other algorithm may be used to make a determination as to whether the object meets an analysis criterion, such as whether or not the object contains a defect. The processing system may be configured to output a signal in dependence on whether or not the object meets a predetermined analysis criterion, based on the spatial-derivative-of-phase data.

When generating graphical-representation data from the spatial-derivative-of-phase data, for outputting on a display device, the processing system may perform any appropriate rendering, graphing or plotting operations. The graphical representation may comprise a two-dimensional map in which the brightness, colour or other property at points in the image depends on the level of spatial phase change at corresponding points on the surface of the object.

The display device may be a display screen—e.g., a two-dimensional LCD panel—or it may be a virtual-reality headset, or any other visual output device. In some embodiments, the display device comprise a projector configured to project a graphical representation of the spatial-derivative-of-phase data onto the surface of the object; it may advantageously project in such a way that the graphical representation is aligned with the surface so that each point in the graphical representation illuminates a point on the object surface to which the spatial-derivative-of-phase data corresponds. Any of the methods or apparatus disclosed in the applicant's earlier application WO2017/085457 may be used in this regard.

The inventor has also realised that vibration amplitude data can be processed, in combination with vibration phase data, to analyse objects in ways that can provide additional insight compared with known optical-interference-based analysis techniques.

Thus, from another aspect, the invention provides a method of analysing an object, comprising:

exciting the object at a vibration frequency so as to induce a stationary or travelling wave, having the vibration frequency, on a surface of the object;

using optical interference to determine vibration phase data for each of a first plurality of points on the surface, the vibration phase data representing, for each point, a respective phase, relative to a common reference phase, of the stationary or travelling wave;

using optical interference to determine vibration amplitude data for each of a second plurality of points on the surface;

processing the vibration phase data and the vibration amplitude data to generate maximum-spatial-derivative-of-displacement data, representative of a respective maximum absolute value, over a time period, of a first-order or a second-order spatial derivative of surface displacement, for each of a third plurality of points on the surface; and processing the maximum-spatial-derivative-of-displacement data to determine a property of the object, or outputting a graphical representation of the maximum-spatial-derivative-of-displacement data on a display device.

From a further aspect, the invention provides a system for analysing an object, comprising:

an exciter for exciting an object at a vibration frequency so as to induce a stationary or travelling wave, having the vibration frequency, on a surface of the object;

an optical-interference-based measurement apparatus configured to use optical interference to:
determine vibration phase data for each of a first plurality of points on the surface, the vibration phase data representing, for each point, a respective phase, relative to a common reference phase, of the stationary or travelling wave; and
determine vibration amplitude data for each of a second plurality of points on the surface; and a processing system configured to:
process the vibration phase data and the vibration amplitude data to generate maximum-spatial-derivative-of-displacement data, representative of a respective maximum absolute value, over a time period, of a first-order or a second-order spatial derivative of surface displacement, for each of a third plurality of points on the surface; and
process the maximum-spatial-derivative-of-displacement data to determine a property of the object, or generate graphical-representation data from the maximum-spatial-derivative-of-displacement data for outputting on a display device.

It will be seen that, in accordance with these aspects of the invention, the maximum, over time, of the time-varying spatial first derivate or second derivate of the dynamic surface displacement at points on the surface, is used to analyse the object. The inventor has found that this maximum, or differences in this maximum, over the surface, can reveal useful information about the composition of the object under the surface. Such a maximum, or differences in maximum, may then be identified by a human or a computer when analysing output representing the maximum spatial derivative over the surface.

Any feature of the former aspects may be a feature of embodiments of these aspects also. In particular, in some embodiments, the processing system may be configured to perform both types of analysis. It may, for example, apply the preceding methods, using only vibration phase data, if the wave or waves on the surface are primarily travelling waves, and apply the present methods, using both vibration phase data and amplitude data, if the wave or waves on the surface are primarily stationary waves. This may be advantageous since the preceding methods work better with travelling waves, whereas the present methods are also effective with stationary waves.

The same measurement beam or image or sequence of images may be used to determine both the vibration amplitude data and the vibration phase data.

The second plurality of points may be the same as the first plurality of points. The third plurality of points may be the same as the first or second plurality of points.

The time period may be one vibration period. Alternatively, it may be a plurality of vibration periods (e.g., two, three or another integer number of vibration periods), or any other appropriate time period.

The processing system may numerically calculate a spatial first derivative of the time-varying surface displacement. When using ESPI, the maximum-spatial-derivative-of-displacement data may be representative of the respective maximum absolute value, over the time period, of the spatial derivative (gradient) of surface displacement.

It will be appreciated that, when using shearography, calculating a first-order spatial derivative of the waveform corresponding to the vibration phase and amplitude data generated using shearography inherently generates a second-order derivative of surface displacement, because shearography measures relative surface displacement, relative to adjacent points along a shearing direction. The processing system may thus calculate a partial derivative in a gradient direction of the partial derivative, in the shearing direction, of surface displacement. Note that the surface displacement may occur in a displacement direction, which may be different from the shearing direction and/or the gradient direction—e.g., the displacement may be out of a plane of the surface, while the gradient and shearing directions may be in the plane.

A respective first-order or second-order spatial derivative of surface displacement may be determined in one or more directions—e.g., in two orthogonal directions. The processing system may combine spatial derivative information from two or more directions so as to determine a respective maximum value, over all directions and over the time period, of the spatial derivative of the surface displacement, for each of the third plurality of points. The maximum-spatial-derivative-of-displacement data may thus represent a maximum in any direction.

The system may excite the object at a plurality of different frequencies—preferably at different times. Respective vibration and amplitude phase data may be determined at each of a plurality of vibration frequencies. Respective maximum-spatial-derivative-of-displacement data may be generated therefrom. The maximum-spatial-derivative-of-displacement data from a plurality of vibration frequencies may be combined to generate combined maximum-spatial-derivative-of-displacement data in any appropriate way—for example, a point-wise averaging (e.g., mean) of a plurality of maximum-spatial-derivative-of-displacement data sets may be performed. This combined maximum-spatial-derivative-of-displacement data may be represented graphically or processed to determine a property of the object.

Similar to the preceding methods, a graphical representation may comprise a two-dimensional map in which the brightness, colour or other property at points in the image depends on the level of the maximum absolute value, over the time period, of the first-order or a second-order spatial derivative of surface displacement at corresponding points on the surface of the object. Any of the techniques disclosed herein for processing spatial-derivative-of-phase data may be used for processing the maximum-spatial-derivative-of-displacement to determine a property of the object.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIGS. 5b-5g are plots of displacement, phase and other derived values, relating to the object of FIG. 5a;

Figure 1:
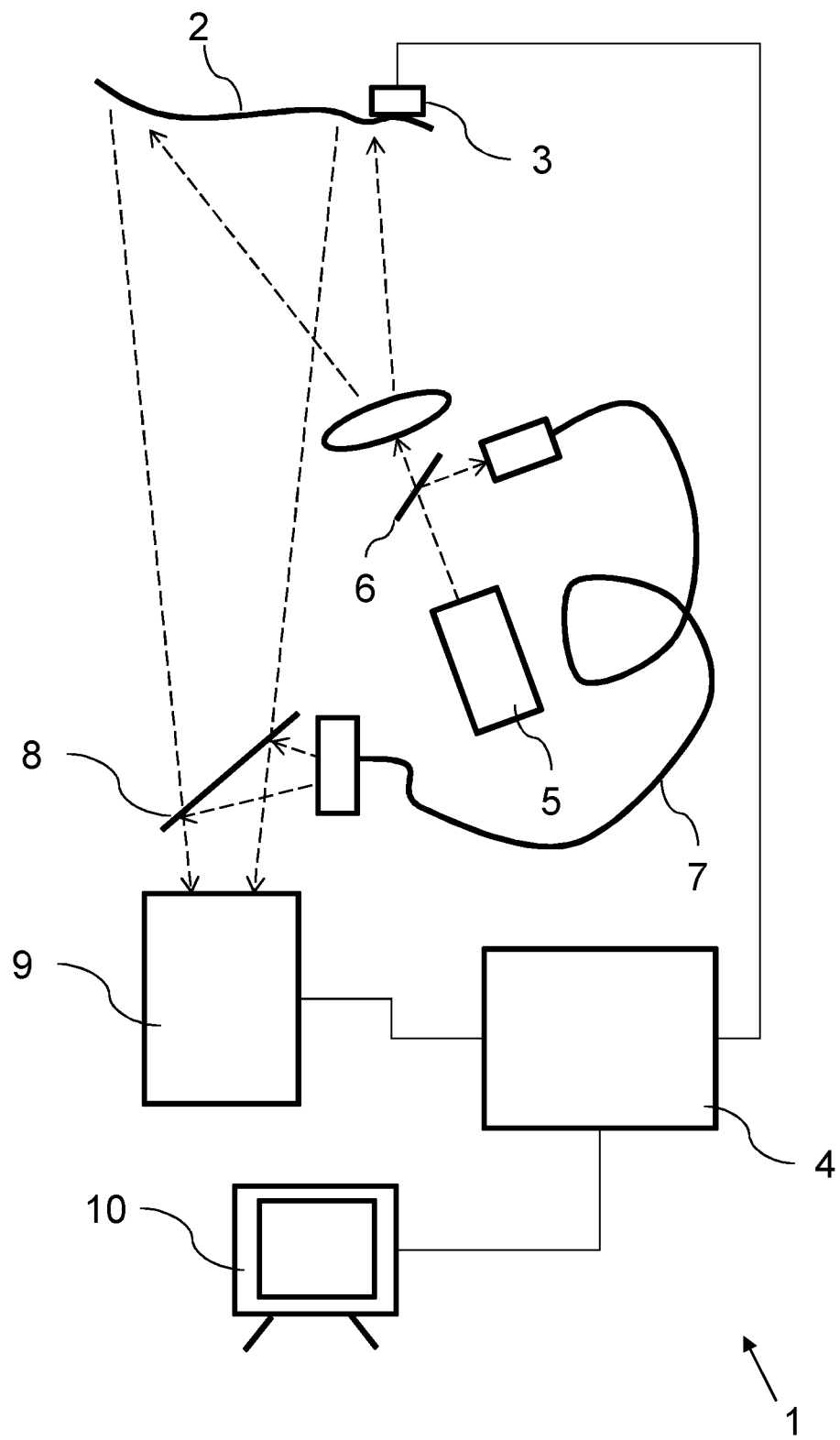
FIG. 1 is a schematic view of an interferometric analysis system embodying the invention.

FIG. 1 shows an interferometric analysis system 1 for analysing an object 2. The system 1 uses vibration-analysis ESPI.

A surface of the object 2 is made to vibrate at a driving frequency by a ceramic piezoelectric exciter 3 which is coupled to the object 2. The exciter is controlled by a processing system 4, to which it is coupled. Alternatively, the object 2 could be excited by an air-coupled transducer, or using an excitation unit embedded in the structure under evaluation (e.g., a piezo unit integrated in the structure during production of the structure), or in any other appropriate way.

A laser 5 emits light towards the object 2. The light passes a beam-splitter 6, which diverts a reference-beam portion through a fibre optic cable 7 to a beam-combiner 8. The beam-combiner 8 combines the reference beam with laser light reflected off the surface of the object 2. A camera 9 captures the interference pattern between the two light paths.

Exemplary light beams are represented by dashed lines in FIG. 1.

Video data from the camera 9 is passed to the processing system 4, which processes the data in one or more of the ways described below. The processing system 4 is connected to a display screen 10 for outputting a graphical representation of the processed data to a human user.

In other embodiments, the system 1 may comprise a projection system for projecting graphical output from the processing system 4 back onto the surface of the object 2, as described in the applicant's earlier application WO2017/085457, the entire contents of which are hereby incorporated by reference.

In other embodiments, the system may be configured to use shearography, instead of ESPI. In this case, the beam-splitter 6, fibre optic cable 7 and beam-combiner 8 will be dispensed with. Instead, a beam-splitter, a reference mirror, and a shearing mirror will be provided in front of the camera 9, so that light from the object 2 interferes with a spatially-offset copy of the same light.

Some or all of these components of the system 1 may be contained in a common housing (not shown). In some embodiments, the processing system 4 and/or display screen 10 may be remote from other components of the system 1—e.g. the processing may be performed by a networked server, which could be located in a different room or building from the object 2.

The processing system 4 uses an appropriate algorithm to calculate vibration amplitude data and/or vibration phase data, for points on the surface of the object 2, from the image data output by the camera 9. In the case of ESPI, this data describes the vibration of the object 2 directly (i.e., based on the changes in axial distance between the object 2 and the camera 9), whereas in the case of shearography the data relates to a gradient (spatial derivative) in the shearing direction, because shearography captures differences in distance between a point on the surface and a neighbouring point, rather than measuring changes in distance for each point independently as in ESPI.

In one arrangement, a heterodyning approach may be used, whereby both the object vibration and the reference wave are excited by a system signal generator. In other embodiments, fringe analysis, such as Fourier analysis, may be performed.

Figure 2:
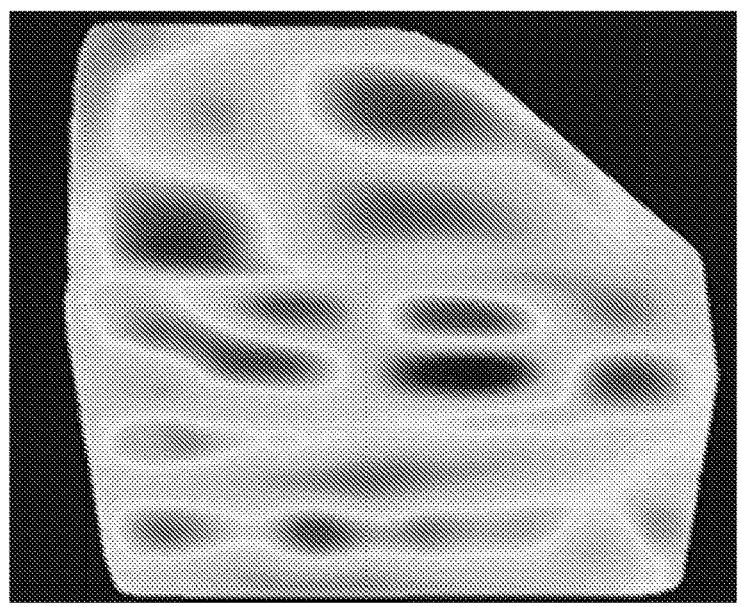
FIG. 2 is an example output frame from an ESPI analysis of a vibrating car door.

FIG. 2 illustrates a typical output from the camera 9 after conventional processing. This example shows measurements, obtained using ESPI, from a car door panel which is being vibrated by an excitation device that has been temporarily attached to the door. Such a display may be animated. The processing system 4 may be able to output such conventional representations on the display screen 10. However, according to the present invention, the processing system 4 can also apply novel processing steps to the image data, as detailed below, which can further enhance the system's usefulness for analysing objects.

When vibration measurements are used to find surface or sub-surface defects in composite materials or other materials, the vibration pattern may reveal defects in the material. Shearography or ESPI can be used to identify if defects are present in an object, because the an object will typically vibrate differently when a defect is present than when there is no defect. These techniques may be able to reveal the location of a defect, by distinguishing between areas that are vibrating more than others, or that are vibrating differently.

Conventional systems may test the vibration amplitude against a "threshold" level to distinguish between vibrating and non-vibrating areas. The vibration amplitude may be analysed at several frequencies, and amplitude averaging techniques used to distinguish between areas with and without defects. However, this is not always effective because, in many cases, and at many excitation frequencies, waves adjacent a defect area may have a different wavelength from waves in areas without defects, but may have approximately the same amplitude. In this case, it would be difficult to identify the defect based on an amplitude threshold analysis only.

Figure 3:
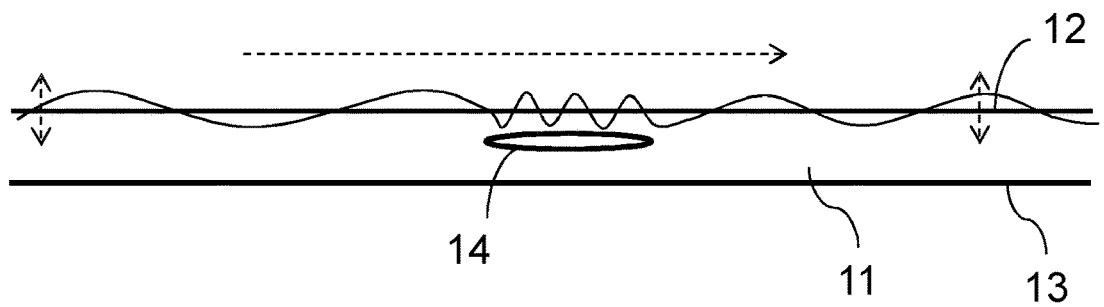
FIG. 3 is a schematic cross-sectional diagram through an object, having a defect, under excitation.

FIG. 3 illustrates such a situation. It shows a side cross section through part of an object 11, such as a composite panel, that has an upper surface 12 and a lower surface 13. The object 11 contains a defect 14 hidden beneath the upper surface 12, such as delamination. The upper surface 12 is being excited so as to cause surface waves to travel over the surface, from left to right, as indicated by the dashed arrow. It is important to note that any particular point on the upper surface 12 moves substantially only vertically, as indicated by the small vertical arrows. It is the waves, rather than the object 11, that are travelling from left to right. The waves on the upper surface 12 are represented by the wavy line in FIG. 3 (not to scale). It can be seen that the spatial vibration period of the wave, as it passes the defect 14, reduces significantly compared with the surrounding regions, but the vibration amplitude remains substantially unchanged.

In embodiments of the present invention, the processing system 4 does not only use vibration amplitude, but also processes vibration phase, thereby overcoming this limitation.

In general, a vibration deflection, U(x, y), across a surface can be expressed as:

$$U(x,y) = U_0(x,y) \cdot \cos(\beta(x,y) + 2\pi f \cdot t), \qquad [\text{Eq. 1}]$$

where x, y are orthogonal axes, $U_0(x, y)$ is the vibration amplitude, $\beta(x, y)$ is the spatial vibration-phase distribution, f is the frequency, and t is time.

The processing system 4 is configured to generate a phase map, $\beta(x, y)$, which may be done using a conventional processing techniques. Data representing the phase map may be stored in a memory of the processing system 4.

Figure 4:
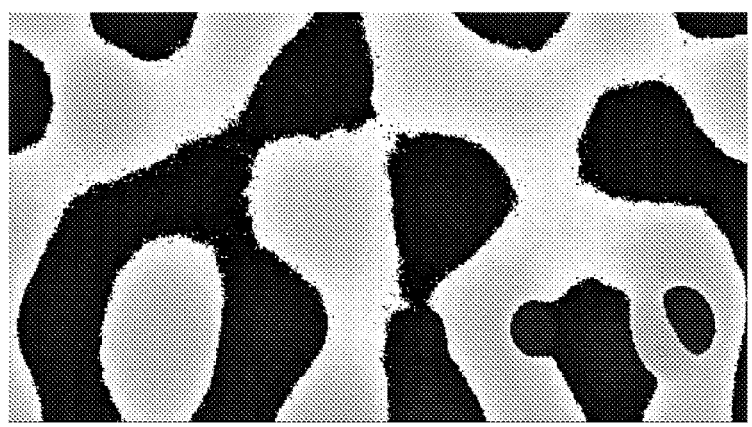
FIG. 4 is a phase map of a vibrating object.

FIG. 4 shows an exemplary phase map, calculated from an object vibrating at an excitation frequency. The pixel intensity represents the vibration phase between 0 and $2\pi$. Areas of constant intensity represent regions where there are standing waves, while the areas of varying grey intensity represent regions with components of travelling waves.

In the case of ESPI, the phase map represents the phase of the vibrational displacement over the surface. In the case of shearography, the phase map represents the phase of a spatial derivative, in the shearing direction, of the vibrational displacement.

In a first set of methods, the processing system 4 processes a phase map to calculate a spatial phase gradient (spatial derivative of the vibration phase), $\beta'(x, y)$, over the surface of the object 2. When doing so, the processing system 4 performs a phase-unwrapping operation to remove all $2\pi$ phase jumps from the image data so that these do not influence the later processing. The spatial phase gradient is preferably calculated for at least two directions across the surface—e.g. for orthogonal x- and y-directions. By combining these gradients from two directions, a maximum absolute value of the vibration phase gradients is found for each sampled point on the object 2, as follows:

$$\left(\frac{\partial \beta(x, y)}{\partial r}\right)_{max} = \sqrt{\left(\frac{\partial \beta(x, y)}{\partial x}\right)^2 + \left(\frac{\partial \beta(x, y)}{\partial y}\right)^2}$$

where $\beta(x, y)$ is the vibration phase distribution on the surface (x, y).

This spatial-derivative-of-phase data represents a two-dimensional image (referred to herein as a spatial-derivative-of-phase image) in which potential defect areas may typically have higher or lower pixel values, over the defect area, than the pixel values of the surrounding region.

In some embodiments, the processing system 4 may calculate a further spatial derivative of the spatial-derivative-of-phase image, in one or more directions, to generate a second-order spatial-derivative-of-phase image. Such an image may usefully highlight the outline of possible defect areas. An edge-detection algorithm could be applied to such a spatial-derivative-of-phase image, to further emphasise the boundaries of possible defect areas.

FIGS. 5a-5g illustrate these steps for the object 11 presented in FIG. 3. The images are aligned vertically—i.e., they have the same horizontal ("x") axes.

Note that, for the sake of simplicity, the plots in FIGS. 5a-5g are cross sections and show only one dimension (along an x axis only). In practice, the processing system 4 will typically analyse the surface waves in two dimensions (e.g., over x and y axes), as already explained above.

Figure 5A:
FIG. 5a is a schematic cross-sectional diagram through an object, having a defect.
Figure 5B:
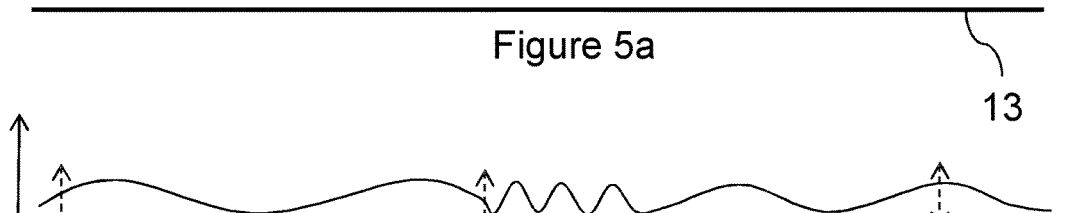

FIG. 5a shows the same object 11 introduced in respect of FIG. 3. FIG. 5b shows the surface wave vibration pattern at an instant in time. The dashed vertical arrows indicate that the upper surface 12 moves substantially only vertically. The waves may be stationary (standing) waves, or may be travelling over the upper surface 12.

Figure 5C:
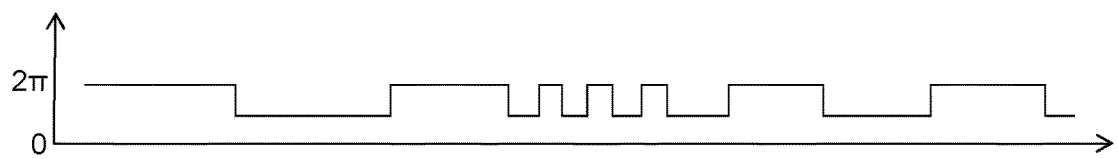

If the waves shown in FIG. 5b are stationary, the phase map (along a cross-section line) will look like the graph in FIG. 5c. The phase typically alternates between $\pi$ and $2\pi$ (or, more generally, between $\beta$ and $\beta+\pi$) between each node of the stationary wave on the upper surface 12.

FIGS. 5d-5g relate to the case where the waves shown in FIG. 5b are travelling from left to right (as was the case in FIG. 3).

Figure 5D:
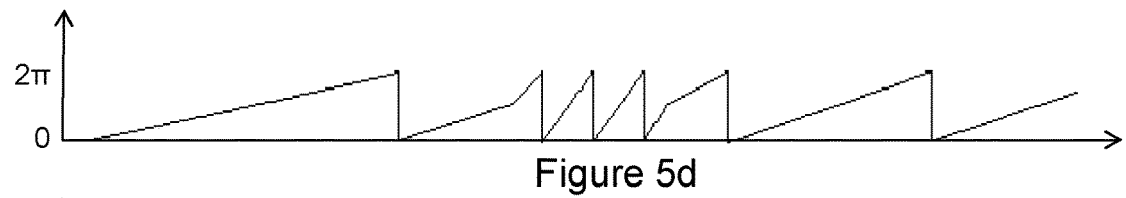

FIG. 5d shows the phase map along the cross-section line. In this case, the phase ramps up approximately linearly from 0 to $2\pi$ with distance along the surface, before wrapping back to zero.

Figure 5E:
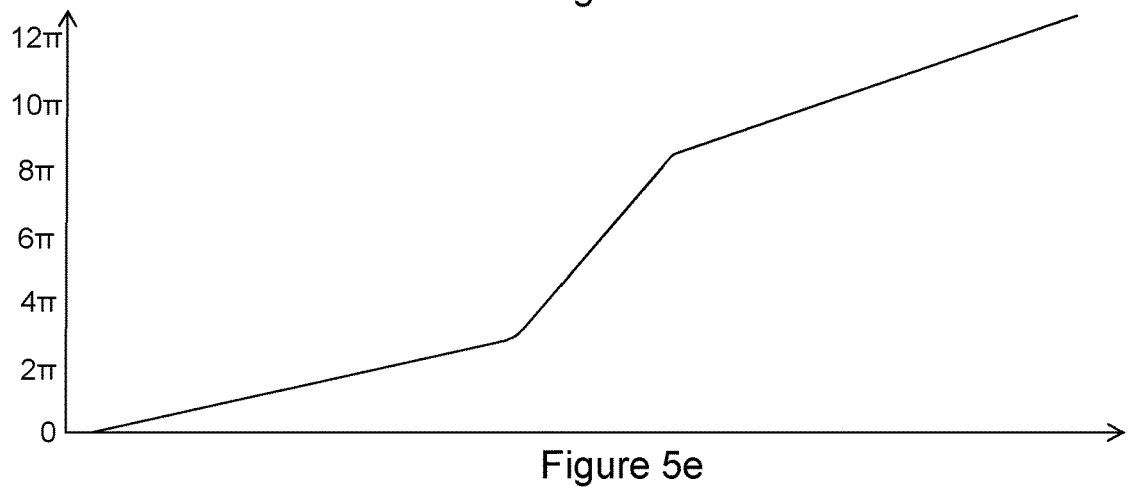

FIG. 5e shows an unwrapped version of the phase map.

Figure 5F:
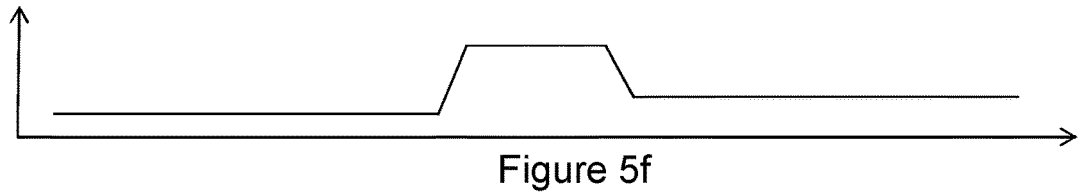

FIG. 5f shows the gradient (first derivative) of the phase map along the x axis. It will be appreciated that, if the processing system 4 renders such a phase map on the display screen 10, assigning brighter pixels to higher values in the spatial-derivative-of-phase image, an area aligned with the defect 14 will be readily apparent to a user as a bright region.

Figure 5G:
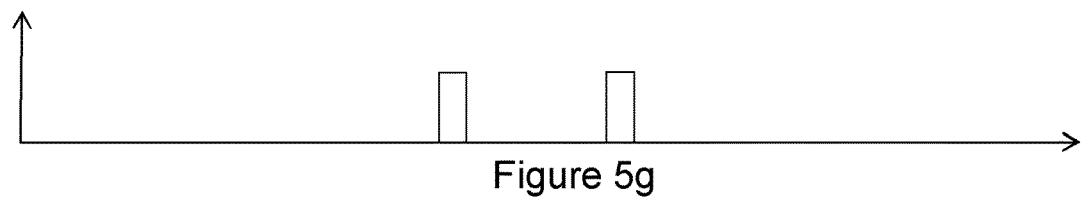

FIG. 5g shows the second derivate of the phase map, along the x axis—i.e., the derivate of FIG. 5f. If the processing system 4 renders such a phase map on the display screen 10, the edges of the defect 14 will be highlighted to the user.

More generally, when a defect is present in an object 2, this defect may be detectable in the vibration pattern at one excitation frequency only, or at some frequencies only. Other frequencies may not reveal the defect at all. When more than one defect is present, these defects may be visible at different excitation frequencies for the object 2.

The processing system 4 could display a spatial-derivative-of-phase image (first-order or second-order) for just one excitation frequency. However, in a preferred set of embodiments, the processing system 4 excites the object at a plurality of different excitation frequencies at different respective times. (ESPI and shearography work best when used with single-frequency excitation, rather than white noise excitation.) Different phase maps and different spatial-derivative-of-phase images are obtained at each excitation frequency.

The excitation frequencies that are used may be selected deterministically or they may be selected at random. Typically, the processing system 4 uses frequencies at equal increments between a start frequency and a stop frequency. The number of distinct excitation frequencies could be two, five, ten, hundreds or even thousands.

The processing system 4 then combines the spatial-derivative-of-phase images, across the excitation frequencies, for example by calculating a pixel-wise average (e.g., mean). This averaged spatial spatial-derivative-of-phase image may then be rendered on the display screen 10 for a human to view, or it may be further processed by the processing system 4—e.g., using a machine-vision or artificial-intelligence algorithm to identify defects.

Processing vibration phase gradients like this is expected to be especially effective at highlighting sub-surface defects when the excitation of the object 2 produces travelling waves across the surface, such as is indicated in FIG. 3. However, it may be useful even where there are large areas of standing waves.

In a second set of methods, the processing system 3 may use phase maps, $\beta(x, y)$, in combination with corresponding amplitude maps, $U_0(x, y)$, for each excitation frequency, f.

The amplitude map, $U_0(x, y)$, for a particular excitation frequency, may be calculated using a conventional processing technique. In the case of ESPI, the amplitude map represents the amplitude of the vibrational displacement over the surface. In the case of shearography, the amplitude map represents the amplitude of a spatial derivative of the vibrational displacement in the shearing direction.

The processing system 4 does not simply average the amplitude maps across different excitation frequencies.

Instead, in the case of ESPI, the processing system 4 uses the phase maps and amplitude maps to calculate, for each of a set of one or more vibration frequencies, the respective maximum absolute value of the spatial gradient of the surface deflection over a vibration period.

Each excitation frequency gives rise to a respective vibration pattern, having a respective amplitude map and phase map. At each vibration frequency, the spatial derivative of the surface vibration deflection, U(x,y), in a particular direction, reaches a maximum absolute value at each point (x, y) on the surface of the object 2 during a single vibration period, 0 to $2\pi$ (corresponding to the parameter $2\pi f \cdot t$ in Eq. 1)

Figure 6:
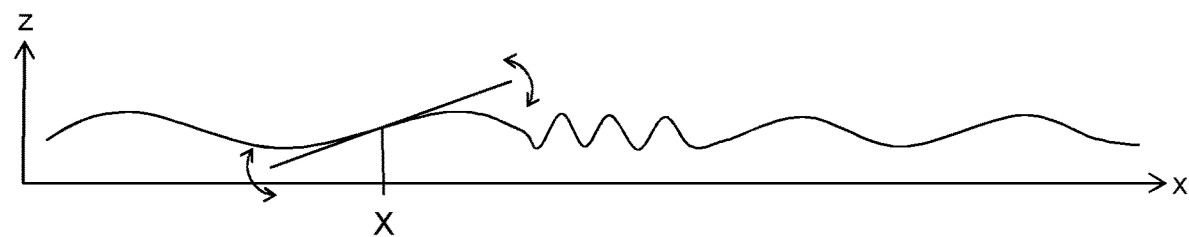
FIG. 6 is a cross-sectional plot of a surface wave showing a spatial derivative calculation.

FIG. 6 illustrates calculating the spatial derivative of the surface deflection, dz/dx, for the wave of FIG. 3, at a particular point X on the object 2. The double-ended arrows indicate the changing value of the spatial derivative of deflection at the point X over the vibration period.

The processing system 3 may determine the spatial derivative in each of two directions, x and y, for a particular vibration frequency, f, and combine these to find the maximum spatial derivative over all directions, for each point (x, y). The maximum absolute value of these spatial derivatives is given by $$\left(\text{abs}\left(\frac{\partial U(x,y)}{\partial r}\right)\right)_{max}$$

It will be appreciated from a careful consideration of FIG. 6 that a defect region may be identified in a maximum-spatial-derivative-of-displacement image as a region of higher (or lower) maximum-spatial-derivative-of-displacement values than the surrounding areas, due to the different wavelengths adjacent a defect region, even if the vibration amplitude does not change significantly.

As in the first set of methods, the processing system 3 may average these maximum-spatial-derivative-of-displacement images over a plurality of different excitation frequencies, to generate an averaged image. Thus, once the maximum deflection-derivative is found for all points on the surface, for a given vibration frequency, the process is repeated with the next excitation frequency, and so on.

This averaged image may then be rendered on the display screen 10 for a human to view, or it may be further processed by the processing system 4—e.g., using a machine-vision or artificial-intelligence algorithm to identify defects.

Figure 7:
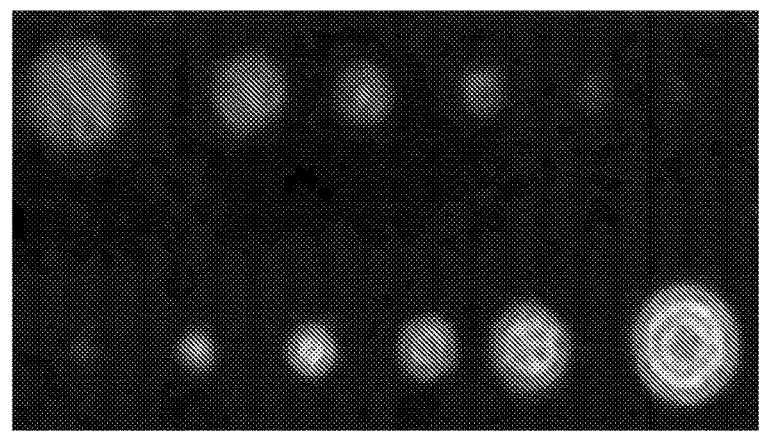
FIG. 7 is a frequency-averaged maximum-spatial-derivative-of-displacement image of an object that has been excited with multiple vibration frequencies.

FIG. 7 shows an image generated from maximum-spatial-derivative-of-displacement images, averaged across a hundred or so different excitation frequencies. FIG. 7 covers the same imaged area as the phase map of FIG. 4. Several sub-surface defects are apparent in the averaged image, which may not have been apparent if using a conventional vibration-amplitude-threshold analysis.

It will be appreciated that this set of methods can give good results with stationary waves as well as with and travelling waves.

If shearography is used, the basic recorded maps represent the vibration phase and vibration amplitude of a spatial vibration gradient on the object surface, where the direction of the gradient is given by the shear. The same operations as described above can still be applied, at each of multiple frequencies, even though the resulting averaged image will include the double (second-order) derivative of the surface vibration phase and surface vibration amplitude.

When shearography is used, the processing system 3 may calculate a plurality of averaged images, using any of the methods disclosed above, for different shear angles and/or different shear levels, and then combine (e.g., average) the results obtained.

In some embodiments, the processing system 3 may apply speckle averaging, to increase the resolution of the defects. Speckle averaging may, for example, be performed by moving the illumination point source between recordings and averaging the results, or by moving an aperture within the camera 9, or in any other appropriate way.

It will be appreciated by those skilled in the art that the invention has been illustrated by describing various specific embodiments thereof, but is not limited to these embodiments; many variations and modifications are possible, within the scope of the accompanying claims.

The invention claimed is:

1. A method of analysing an object, comprising:
    exciting the object at a vibration frequency so as to induce a stationary or travelling wave, having the vibration frequency, on a surface of the object;
    using optical interference to determine vibration phase data for each of a plurality of points on the surface, the vibration phase data representing, for each point, a respective phase, relative to a common reference phase, of the stationary or travelling wave;
    applying a digital spatial-derivative filter to the vibration phase data to generate spatial-derivative-of-phase data representative of spatial changes in vibration phase across the surface; and
    processing the spatial-derivative-of-phase data to determine a property of the object, or outputting a graphical representation of the spatial-derivative-of-phase data on a display device.

2. The method of claim 1, wherein the vibration phase data represents the respective phases, at the plurality of points, at one or more common moments in time.

3. The method of claim 1, comprising exciting the object so as to induce a travelling wave.

4. The method of claim 1, comprising exciting the object with an exciter, wherein the common reference phase is defined by motion of the exciter.

5. The method of claim 1, comprising illuminating the object with at least one coherent light beam.

6. The method of claim 1, comprising using electronic speckle pattern interferometry (ESPI), electronic shearography, or scanning laser Doppler vibrometry (LDV) to determine the vibration phase data.

7. The method of claim 1, wherein the vibration phase data represents the absolute displacement of the surface.

8. The method of claim 1, wherein the vibration phase data represents the phase of a relative displacement of the surface.

9. The method of claim 1, wherein the digital spatial-derivative filter calculates a spatial gradient value for some or all of the plurality of points on the surface.

10. The method of claim 1, wherein the digital spatial-derivative filter outputs a spatial first or second derivative of the vibration phase.

11. The method of claim 1, wherein the digital spatial-derivative filter combines spatial gradient information from two or more directions to determine a respective maximum value, over all directions, of the spatial gradient of the vibration phase, for each of a plurality of points on the surface of the object.

12. The method of claim 1, comprising:
exciting the object at a plurality of different vibration frequencies in a sequence;
obtaining a respective set of vibration phase data for each vibration frequency;
applying the digital spatial-derivative filter to each set of vibration phase data to generate respective spatial-derivative-of-phase data for each vibration frequency;
combining the respective spatial-derivative-of-phase data to generate combined spatial-derivative-of-phase data; and
processing the combined spatial-derivative-of-phase data to determine a property of the object, or outputting a graphical representation of the combined spatial-derivative-of-phase data on a display device.

13. The method of claim 1, comprising applying an image-processing technique to the spatial-derivative-of-phase data to determine a property of the object.

14. A system for analysing an object, comprising:
an optical-interference-based measurement apparatus configured to use optical interference to determine vibration phase data for each of a plurality of points on a surface of an object that is vibrating at a vibration frequency such that a stationary or travelling wave, having the vibration frequency, is present on the surface of the object, the vibration phase data representing, for each point, a respective phase, relative to a common reference phase, of the stationary or travelling wave; and
a processing system comprising hardware logic and/or comprising a processor and a memory storing software instructions for execution by the processor, wherein the processing system is configured to:
apply a digital spatial-derivative filter to the vibration phase data to generate spatial-derivative-of-phase data representative of spatial changes in vibration phase across the surface; and
process the spatial-derivative-of-phase data to determine a property of the object, or generate graphical-representation data from the spatial-derivative-of-phase data for outputting on a display device.

15. The system of claim 14, further comprising an exciter for exciting the object at the vibration frequency so as to induce the stationary or travelling wave on the surface of the object.

16. A method of analysing an object, comprising:
exciting the object at a vibration frequency so as to induce a stationary or travelling wave, having the vibration frequency, on a surface of the object;
using optical interference to determine vibration phase data for each of a first plurality of points on the surface, the vibration phase data representing, for each point, a respective phase, relative to a common reference phase, of the stationary or travelling wave;
using optical interference to determine vibration amplitude data for each of a second plurality of points on the surface;
processing the vibration phase data and the vibration amplitude data to generate maximum-spatial-derivative-of-displacement data, representative of a respective maximum absolute value, over a time period, of a first-order or a second-order spatial derivative of surface displacement, for each of a third plurality of points on the surface; and
processing the maximum-spatial-derivative-of-displacement data to determine a property of the object, or outputting a graphical representation of the maximum-spatial-derivative-of-displacement data on a display device.

17. The method of claim 16, comprising exciting the object so as to induce a standing wave.

18. The method of claim 16, comprising using a common set of imaging data to determine both the vibration phase data and the vibration amplitude data.

19. The method of claim 16, wherein the first plurality of points, second plurality of points and third plurality of points are identical.

20. The method of claim 16, comprising:
exciting the object at a plurality of different vibration frequencies at different times;
determining a respective set of vibration and amplitude phase data for each of the vibration frequencies;
generating respective maximum-spatial-derivative-of-displacement data from each set of vibration and amplitude phase data;
combining the respective maximum-spatial-derivative-of-displacement data; and
processing the combined maximum-spatial-derivative-of-displacement data to determine a property of the object, or outputting a graphical representation of the combined maximum-spatial-derivative-of-displacement data on a display device.

21. A system for analysing an object, comprising:
an optical-interference-based measurement apparatus configured to use optical interference to:
determine vibration phase data for each of a first plurality of points on a surface of an object that is vibrating at a vibration frequency such that a stationary or travelling wave, having the vibration frequency, is present on the surface of the object, the vibration phase data representing, for each point, a respective phase, relative to a common reference phase, of the stationary or travelling wave; and
determine vibration amplitude data for each of a second plurality of points on the surface; and
a processing system comprising hardware logic and/or comprising a processor and a memory storing software instructions for execution by the processor, wherein the processing system is configured to:
process the vibration phase data and the vibration amplitude data to generate maximum-spatial-derivative-of-displacement data, representative of a respective maximum absolute value, over a time period, of a first-order or a second-order spatial derivative of surface displacement, for each of a third plurality of points on the surface; and
process the maximum-spatial-derivative-of-displacement data to determine a property of the object, or generate graphical-representation data from the maximum-spatial-derivative-of-displacement data for outputting on a display device.

22. The system of claim 21, further comprising an exciter for exciting the object at the vibration frequency so as to induce the stationary or travelling wave on the surface of the object.

* * * * *